(12) United States Patent
Bachoura

(10) Patent No.: US 10,492,635 B2
(45) Date of Patent: Dec. 3, 2019

(54) COVERING ATTACHMENTS FOR CHOPSTICKS

(71) Applicant: Blue Diamond Holdings LLC, Camden, DE (US)

(72) Inventor: Bernard Bachoura, San Dimas, CA (US)

(73) Assignee: Blue Diamond Holdings LLC, Camden, DE (US)

( * ) Notice: Subject to any disclaimer, the term of this patent is extended or adjusted under 35 U.S.C. 154(b) by 32 days.

(21) Appl. No.: 15/310,739

(22) PCT Filed: May 12, 2015

(86) PCT No.: PCT/US2015/030436
§ 371 (c)(1),
(2) Date: Nov. 11, 2016

(87) PCT Pub. No.: WO2015/175575
PCT Pub. Date: Nov. 19, 2015

(65) Prior Publication Data
US 2017/0079452 A1     Mar. 23, 2017

Related U.S. Application Data

(60) Provisional application No. 61/992,333, filed on May 13, 2014.

(51) Int. Cl.
*A47G 21/06*     (2006.01)
*A47J 43/28*     (2006.01)

(52) U.S. Cl.
CPC .......... *A47G 21/103* (2013.01); *A47J 43/288* (2013.01)

(58) Field of Classification Search
CPC ...................................................... A47J 43/288
USPC ............................................................ 294/218
See application file for complete search history.

(56) References Cited

U.S. PATENT DOCUMENTS

| | | | | |
|---|---|---|---|---|
| 5,390,972 A * | 2/1995 | Galloway | ............... | A47G 19/00 30/345 |
| 5,431,465 A * | 7/1995 | Shibata | ................ | A47G 21/103 294/218 |
| D446,425 S * | 8/2001 | Wei | ............................... | D7/642 |
| 7,093,868 B1 * | 8/2006 | Shen | .................... | A47G 21/103 206/553 |
| 7,878,563 B2 * | 2/2011 | Beckham | ............. | A47G 21/103 294/218 |
| 8,038,187 B2 * | 10/2011 | Resnick | ................ | A47J 43/283 294/218 |
| D662,320 S * | 6/2012 | De Leo | ................ | A47G 21/103 294/218 |

(Continued)

FOREIGN PATENT DOCUMENTS

| GB | 2442556 | * 4/2008 |
|---|---|---|
| JP | 3180818 | * 10/2013 |

*Primary Examiner* — Paul T Chin
(74) *Attorney, Agent, or Firm* — Quan & Associates; Nancy N. Quan; Christopher Quan

(57) ABSTRACT

The present invention provides for an improved eating utensil, with improved traction, better scooping and/or cutting. Unlike the traditional chopstick which does not pick up food items easily or manipulate the food items, like cutting or scooping, the present invention provides a covering attachment having pick up features, scooping features and cutting features, making chopsticks into better eating tools and more sanitary.

20 Claims, 6 Drawing Sheets

(56) References Cited

U.S. PATENT DOCUMENTS

| | | | |
|---|---|---|---|
| 2002/0174548 A1* | 11/2002 | Day | A47G 21/103 30/143 |
| 2009/0026782 A1 | 1/2009 | Lion | |
| 2009/0050515 A1* | 2/2009 | Yang | A47G 21/103 206/553 |
| 2009/0051179 A1 | 2/2009 | Wang et al. | |
| 2009/0091146 A1 | 4/2009 | Liu | |
| 2009/0126204 A1* | 5/2009 | Wagner | A47G 19/00 30/345 |
| 2011/0042977 A1* | 2/2011 | Shen | A47G 21/103 294/218 |
| 2013/0171602 A1* | 7/2013 | Lin | A47J 43/283 294/218 |
| 2016/0089927 A1* | 3/2016 | Hsu | B43K 29/004 401/195 |

* cited by examiner

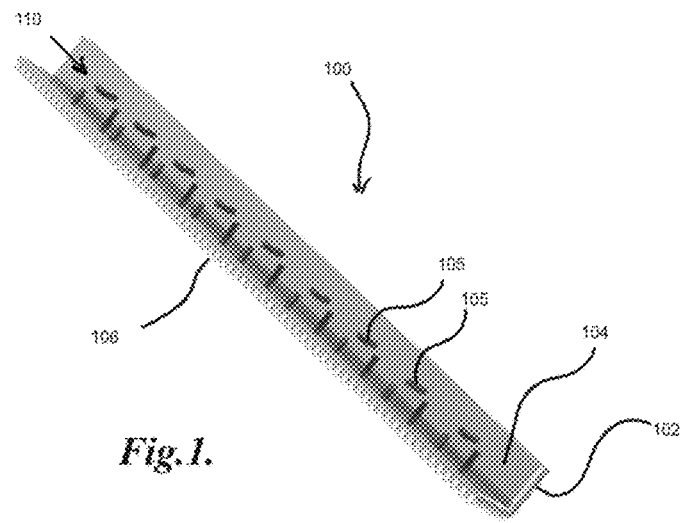
Fig.1.
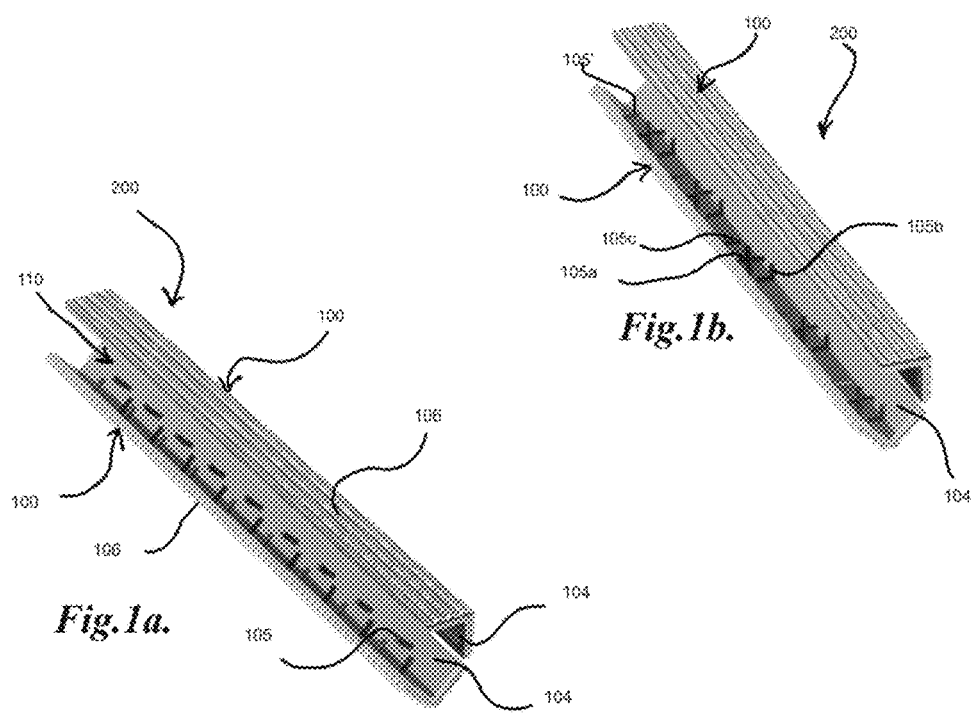
Fig.1b.
Fig.1a.

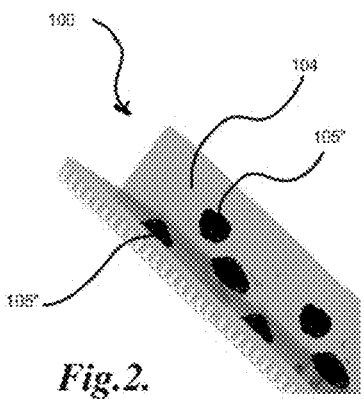
Fig.2.
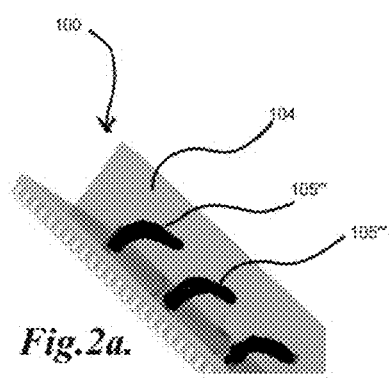
Fig.2a.
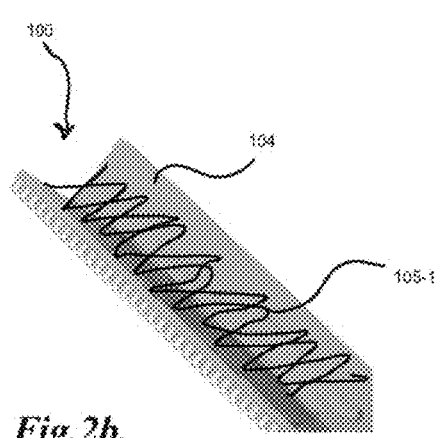
Fig.2b.
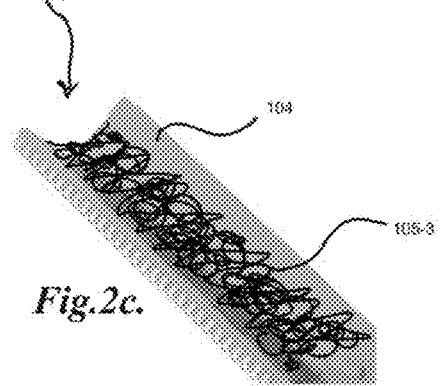
Fig.2c.
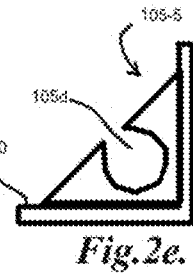
Fig.2e.
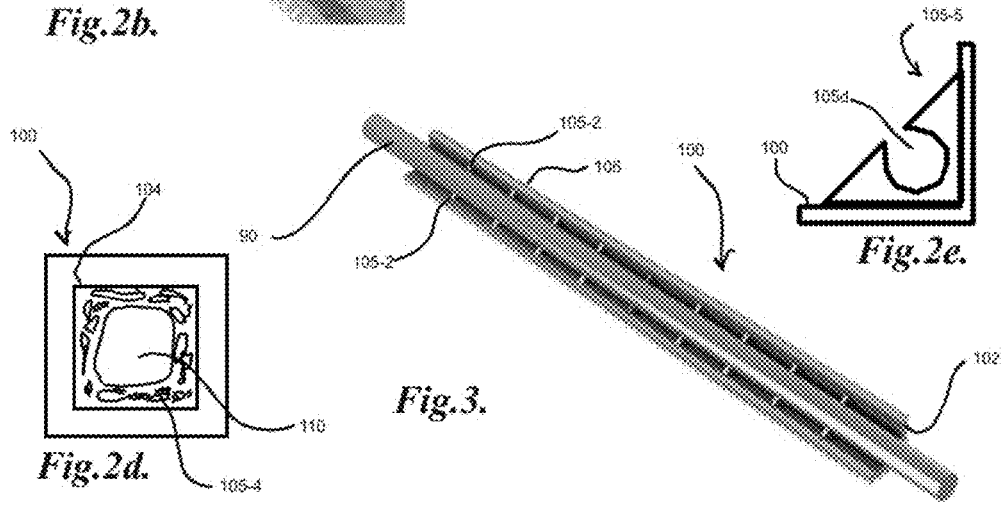
Fig.2d.
Fig.3.

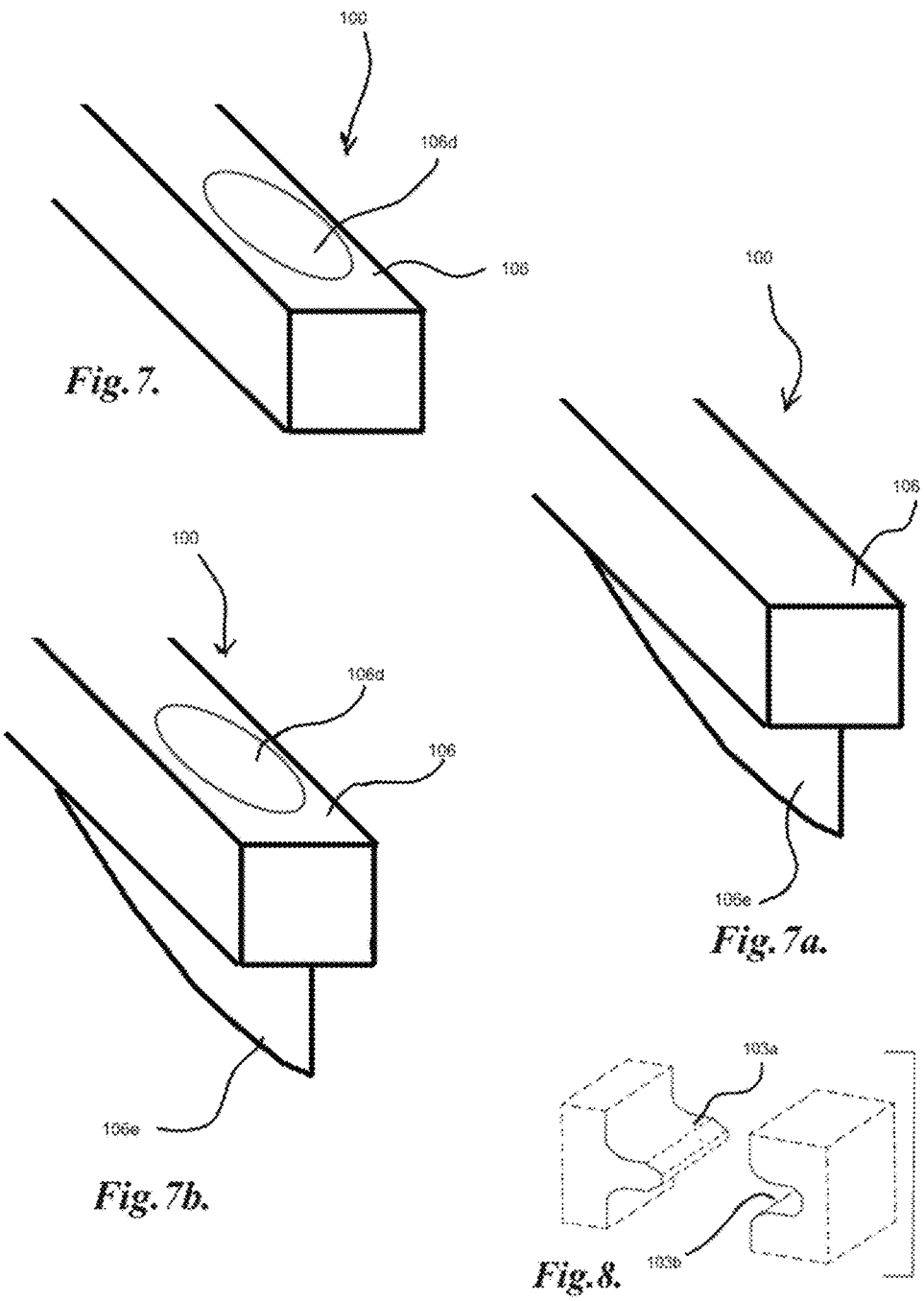

COVERING ATTACHMENTS FOR CHOPSTICKS

CROSS-REFERENCE TO RELATED APPLICATIONS

This is a U.S. national stage application of a PCT international application No. PCT/US15/30436, filed May 12, 2015, "COVERING ATTACHMENT FOR CHOPSTICKS", which claims the priority and benefit of U.S. provisional patent application Ser. No. 61/992,333, filed May 13, 2014, entitled "COVERING ATTACHMENTS FOR CHOPSTICKS", the contents of which is hereby incorporated by reference in its entirety.

FIELD OF THE INVENTION

This invention is in the general field of eating utensils. In general, this invention relates to the area of chopsticks. Particularly, the present invention relates to attachments for chopsticks for providing more sanitary eating utensils with improved utility.

BACKGROUND OF THE INVENTION

Chopsticks are common eating utensils in the Asian countries or in restaurants serving Asian cuisines. As Asian cuisines increase in popularity, so is the popularity of chopsticks. Chopsticks generally serve the purposes of a fork and more and sometimes are used in addition to a fork. Each set of chopsticks are held in a hand in a certain manner and their movements are coordinated with one another such that even the smallest food particle can be picked up.

SUMMARY OF THE INVENTION

The present invention relates to a covering attachment for chopsticks to make ordinary and/or standard chopsticks into better eating utensils. The covering attachment may include a hollow structure adapted for enclosing at least a portion of any ordinary and/or standard chopsticks, disposable or otherwise, and includes a hollow body with an outer surface and an inside surface with a thickness therebetween joining the inside surface and the outside surface. The inside surface of the covering attachment may include a plurality of attachment features for aiding in attaching the covering structure to the chopstick during use and removal from said chopstick after use. The covering attachment may generally fit securely onto the chopstick. At least one food handling feature is present on the outside surface of the covering attachment. The food handling feature may include features for aiding in picking up food articles, for aiding in cutting up food articles or combinations thereof In addition, the covering attachment in general presents a larger circumferential span than any chopsticks and thus maybe more ergonomic.

The present invention also provides for a universal covering attachment, to cover chopsticks of any size or shape. The attachment features may include resilient features or projections, aiding in making this possible. The features may extend and contract to fit the size or shape of the chopstick so that the covering attachment is secured and universally fit onto any chopsticks.

The food handling features aiding in picking up food articles easier may also aid in better retaining of food articles once pick up. In addition to the above described food handling features, the outside surface of the hollow body may also include features for further aiding in food pick up or in cutting up food particles or both. Most of these features may be present towards the food picking up end of the chopstick once it is covered or attached to the covering attachment. Additional texturing of the outside surface may also be included to further aid in food pick up or retention.

The plurality of attachment features may aid in attaching or securing the hollow body to the chopstick it is associated with during use and aid in removal after use. The covering and/or chopstick may then be cleaned for re-use where either or both the covering and chopsticks is/are reusable; or may be disposed of after removal if the chopstick is not disposable and the covering is. In cases where both the covering and chopsticks are disposable, no removal is necessary. In such cases, the covering may, for example, be simplified since no removal is necessary and, for further example, the covering may be substantially permanently attached after it is secured.

In one embodiment, the hollow body of the covering attachment may be of a tubular structure having a square or rectangular cross-section, a triangular cross-section, or a circular cross-section. The structure of the covering may be of the same or different cross-sectional configuration, for example, the cross-section of the outside surface maybe square or rectangular while the inside surface may be circular or vice versa. The tubular structure may be closed at one end or open at both ends. The tubular body may be an integral structure or may come in two sections to be mated together with corresponding mating features on both sections. The food handling features on the two sections may or may not be identical. Apart from the food handling features and attachment features, the two sections may general be identical with complementary interlocking features, or they may be different.

In another embodiment, the hollow body of the covering may be more than one half and less than one integral structure, for example, more than a half clam shell or C-shape configuration and generally more than a three-quarter section, open at both ends or at one end.

The hollow body may or may not be a self supporting structure, and it is not necessary for it to be structurally rigid by itself. In one embodiment, the covering may be a rigid structure or a semi-rigid structure. In another embodiment, the covering may be a resilient structure and the underlining chopstick may serve to stiffen the structure. In a further embodiment, the covering may be collapsible when not attached to the chopstick.

The plurality of attachment features may come in different forms or configurations. In one embodiment, the attachment features may include resilient projections, projecting from the inside surface of the hollow body. The resilient projections may include flexible or semi-flexible tendrils or fibril-like features that may bend or extend. The projections may project from the inside surface in various directions, for example, in an orthogonal direction from the surface, such as making an acute angle with the surface. For example, the tendrils or fibril-like features may extend to contact any surfaces they are to attach, or bend to release from such surfaces. These tendrils or fibril-like features may be bristle-like, for example, like those bristles on a tooth brush head, on the inside surface of the hollow body, and may or may not be present on substantially the entire inside surface. In another embodiment, the attachment features may include flexible or semi-flexible array of small bumps, disposed on the inside surface of the hollow body and may or may not be present on substantially the entire inside surface. They may also project from the inside surface of the hollow body. In yet another embodiment, the attachment feature may include mesh-like features, projecting from the inside surface of the hollow body, and may expand and contract, and may or may not be present on substantially the entire inside surface. In still another embodiment, the attachment feature may include elements which may act as leaf springs, which may flex to provide a biasing force to hold the covering onto the chopstick. In yet another embodiment, the features may be sponge like and may or may not be present on substantially the entire inside surface of the hollow body. The sponge-like features may also be a foam layer surrounding the inside surface of the hollow body, though may not necessary surround the entire inside surface. In still other embodiments, the attachment features may include snap-in cutouts shaped to hold a chopstick. In any of the embodiments, the semi-flexible or flexible features may be made of resilient materials including elastomeric materials that may securely hold onto the chopstick during use and also enable the covering attachment to be easily inserted or removed from the chopsticks.

In one embodiment, the hollow body of the covering attachment may be made of the same material as that of the attachment features. In another embodiment, the attachment features of the hollow body of the covering attachment may be made of a more elastomeric material than the hollow body. In a further embodiment, the hollow body of the covering attachment may be made of a rigid material, including polymeric materials that are of a rigid nature, bamboo, or metal.

The hollow body of the covering attachment may be closed at one end or may be open at both ends. The hollow body may be straight or tapered, and if tapered, it may generally taper towards the closed end, if present.

In one aspect, the attachment or removal of the covering attachment may be accomplished by an axial action, pulling or pushing along the longitudinal axis of the covering attachment. The attachment features may be flexible and bend or contract about the longitudinal axis, or compress laterally. In another aspect, the attachment or removal of the covering attachment may be accomplished by a rotary action, rotating about the longitudinal axis of the covering attachment. The attachment features may rotate or twist about the longitudinal axis. The hollow body may also be resilient to aid in the attachment or removal, and to conform to different shapes and sizes of the chopsticks.

In the embodiment where the hollow body is formed from two mating sections, each section may be positioned onto the chopstick and then mated together. For removal, the sections may be pulled apart and then removed. The body may also be resilient and may flex to aid in the attachment and removal.

In the half clam-shell or C-shaped sections, or generally more than three-quarter section configuration of the hollow body, the body itself may also be resilient and may flex to aid in the attachment and removal or aid in conforming to different size and shape of the chopsticks. In this configuration, the food handling portion of the chopstick may not be completely covered, even if the hollow body is closed at one end. The various cross-sections of the tubular body disclosed above are also applicable here, though with one longitudinal portion of the body being missing.

In one exemplary embodiment, the food handling feature on the outside surface of the covering attachment, whether the hollow body is an integral tubular structure, two sections or a three-quarter section, half clam shell or C-shaped sections, may include features for aiding in picking up food articles, as noted above. The food handling features on the outside of the covering attachment may include at least one depression, for example, a dimple, a channel or groove disposed, at least, towards the food handling end of the covering. The dimple, groove or channel may extend in a lengthwise direction, along the longitudinal axis of the covering, towards the food handling end of the covering, and may be so shaped as to minimize any food or liquid that is picked up from existing from the end of the covering. The dimple, groove or channel may in general have a major axis and a minor axis, with the major axis either slightly longer or substantially longer than the minor axis. For example, some of these food handling features may resemble a spoon.

The length of the covering attachment may vary and may cover a portion of or at least the traditional length of the chopstick generally used for food handling. The covering attachment may also include a portion on the outside surface for gripping by the fingers of the user if desired. The gripping portion may be smooth or roughen to aid in the grip. In some embodiments, the gripping portion may include an indent for easier grip by any part of the finger or fingers. The shape of the food handling feature may include a dimple, groove or channel that may be of an oval shape, or those having a triangular cross-section, or a rectangular cross-section. For all the shapes, they are open at least at the top. In one aspect, the dimple, groove or channel may be enclosed by walls having a straight line configuration. In another aspect, the groove or channel may be enclosed by walls having a curved or winding cross-sectional configuration. The dimple, groove or channel may taper along the longitudinal axis of covering so that the dimple, groove or channel may include a wider cross-section towards the end than the beginning, or the dimple, groove or channel may taper along the longitudinal axis from a central location towards both ends. In one embodiment, the grove or channel may aid in transforming any smooth surface chopstick into a better food gripping chopstick. In another embodiment, the groove or channel may aid in transforming any chopstick into, for example, a spoon-like utensil for scooping, as noted above.

In addition to the configuration of the walls, the number of walls may also vary. In one embodiment, the dimple, groove or channel may include two walls. The walls may be connected at least one end. When connected at one end, the configuration is open at the top and one end. When they are connected at both ends, the configuration will only be open at the top. In another embodiment, the groove or channel may include more and two walls. All the walls may be connected on both ends, or one of the walls may be connected at one end. In either case, the configuration is open at the top.

In one embodiment, the dimple, channel or groove, whether it has two or three walls, may be opened at one end in addition to the top. In another embodiment, the dimple, channel or groove, whether it has two or three walls, it may be completely enclosed except for the opening at the top.

In another exemplary embodiment, whether the hollow body is an integral tubular structure, two sections or more or less three-quarter sections, half clam shell or C-shaped sections, the food handling features may include features for aiding in cutting up food articles, as noted above. The features for aiding in cutting up food articles may include at least one ridge, a raised edge, or bump disposed towards the food handling end of the covering. The ridge, raised edge or bump may extend in a lengthwise direction, along the longitudinal axis of the covering, towards the food handling end of the covering. The length of the covering attachment may vary and may cover a portion of or at least the traditional length of the chopstick generally used for food handling. In the case when the cross-section of the hollow body is triangular, the feature may be provided by the configuration of the body.

In any of the above described embodiment, the covering attachment may also include a portion on its outside surface, for gripping by the fingers of the user, if desired. The gripping portion may be smooth or roughen to aid in the grip. In some embodiments, the gripping portion may include an indent for easier grip by any part of the finger or fingers.

In one aspect, the ridge, raised edge or bump may include walls that may be straight. In another aspect, the ridge, raised edge or bump may include walls that may be curved. The bump, raised edge or ridge may taper along the longitudinal axis of the covering so that the ridge, raised edge or bump may include a wider cross-section towards the end than the beginning, or the bump, raised edge or ridge may taper towards both ends from a central location. In one embodiment, the raised edge, ridge or bump may aid in transforming any smooth surface chopstick into a better food gripping chopstick. In another embodiment, the raised edge, bump or ridge may aid in transforming any chopstick into a better cutting utensil to aid in cutting up food.

In addition to the configuration of the walls, the number of walls may also vary, as noted above. In one embodiment, the ridge or bump may include two walls. The walls may be connected at least at one end. When connected at one end, the configuration is open at one end. When they are connected at both ends, the configuration will be completely enclosed. In another embodiment, the ridge, raised edge or bump may include more than two walls. All the walls may be connected on both ends, or one of the walls may be connected at one end. In either case, the configuration is closed at the top.

In yet another exemplary embodiment, whether the hollow body is an integral tubular structure, two sections or a more than three-quarter sections, half clam shell or C-shaped sections, the food handling features may include a combination of at least one of a ridge, raised edge, or bump, as discussed above, and at least one of a dimple, channel or groove, as also discussed above, disposed towards the food handling end of the covering. The combination of features may extend in a lengthwise direction, along the longitudinal axis of the covering, towards the food handling end of the covering. The length of the covering attachment may vary and may cover a portion of or at least the traditional length of the chopstick generally used for food handling. In the case where the hollow body has two sections to be mated, the food handling feature for aiding in cutting or cutting may be on the outside surface of one section while the picking up feature on the other section. The covering attachment may also include a portion for gripping by the fingers of the user if desired. The gripping portion may be smooth or roughen to aid in the grip. In some embodiments, the gripping portion may include an indent for easier grip by any part of the finger or fingers. In one aspect, the features may include walls having a straight cross-sectional configuration. In another aspect, the features may include walls having a curved or winding cross-sectional configuration. The features may taper along the longitudinal axis of the covering so that the features may include a wider cross-section towards the end than the beginning, or wider at a central location and taper towards both end. In one embodiment, the features may aid in transforming any smooth surface chopstick into better food scooping or gripping chopstick. In another embodiment, the features may aid in transforming any chopstick into a better cutting utensil to aid in cutting or aiding in cutting up food, for example, prior to picking up the food.

According to one embodiment, the covering may include a tubular configuration for surrounding a portion of the chopstick it is associated with an open end and a closed end. In one aspect, the tubular configuration may have a circular cross-section. In another aspect, the tubular configuration may include a non-circular configuration, for example, it may have a square cross-section, rectangular cross-section, or triangular cross-section. The closed end may be the food handling end and thus also helps make the eating experience more sanitary as the chopsticks do not come in contact with the food.

According to another embodiment, the covering may include a tubular configuration for surrounding a portion of the chopstick it is associated with open ends. In one aspect, the tubular configuration may have a circular cross-section. In another aspect, the tubular configuration may include a non-circular configuration, for example, it may have a square cross-section, rectangular cross-section, or triangular cross-section. In this configuration, the tip of the chopstick may extend beyond the end of the covering if desired.

Whether the hollow body is an integral tubular structure, two sections or a more than three-quarter sections, half clam shell or C-shaped sections, the cross-sectional configurations described above are also applicable.

The length of the covering attachment may vary and the portion of the chopstick to be covered may vary in length and location on the chopstick, as noted above. In one aspect, the food handling end may be covered completely by the covering attachment so that the food does not come into contact with the underling chopstick, especially if the covering includes a closed end. In another aspect, the end of the chopsticks may extend outside the covering attachment, as noted above.

The body of the covering attachment may be made of any polymeric material or metal approved for food contact, and may have sufficient stiffness at its thickest portion to be a standalone structure, if so desired, even if the portions where the dimple, groove or channel is present may not be of sufficient structural stiffness. In some instances, the hollow structure may be collapsible, as also noted above. The body may also be made of bamboo.

For polymeric materials of inherently greater structural stiffness, the thickness of the covering may be decreased. For the polymeric materials that have less structural stiffness, the thickness of the covering may be increased. The material may also be, for example, film forming, or moldable.

The polymeric material may include, but not limited to generally inert materials that do not contain harmful monomers or oligomers that may leach out, for example, polyolefins, polyesters and copolyesters, polyamides, melamine, silicone polymers, synthetic rubbers, cellulosic materials.

The metal may include metal and metal alloys that may be generally non-toxic and non-corrosive material. In one aspect, the covering may be molded into the desired form and shape, having the features on its outside surface and inside surface. In another aspect, the covering may first be formed in sheet or film-form, with the desired features on both surfaces, either added later or formed together, and then the film or sheet may be fashioned or joined together to form the covering or the film may be shaped to the desired configuration, for example, two half sections or one three-quarter section. The film may be drawn, cast, extruded, calendared, extruded and calendared, machined or blown.

The polymeric material may also be filled or colored, provided the coloring agent and/or filler is approved for food contact. In general the filler may improve and/or maintain the structural stiffness of the covering without substantially increasing the caliper of the covering.

The polymeric material may also be biodegradable or compostable, provided the material is approved for food contact. In general, biodegradability or compostability is considered better for the environment.

When the hollow body comes in two sections, each section may include complementary interlocking or mating features for mating the two sections together or snap fitting the two sections together with offsetting components and easy release feature. The interlocking or mating features may include grooves and protrusions, tongue and groove, and similar.

The present invention together with the above and other advantages may best be understood from the following detailed description of exemplary embodiments of the invention illustrated in the drawings below.

BRIEF DESCRIPTION OF THE FIGURES

FIG. 1 illustrates an embodiment of a covering attachment with attachment features extending substantially orthogonally from the inner surface;

FIG. 1a illustrates multiple covering attachments which form a fully enclosing or encircling covering attachment;

FIG. 1b illustrates an embodiment of a covering attachment with attachment features extending at non-orthogonal angles from the inner surface;

FIGS. 2, 2a, 2b, 2c, 2d and 2e illustrate different embodiments of attachment features on the inner surface of a covering attachment;

FIG. 3 illustrates a chopstick interfacing with a covering attachment with attachment features extending from the corners;

FIG. 3a illustrates a chopstick interfacing with a covering attachment with attachment features extending from the inner surface;

FIGS. 3b and 3c show cross-sectional views of a chopstick inserted into a covering attachment with compressed attachment features;

FIGS. 4 and 4a illustrate different textures on the outer surface of the covering attachment;

FIG. 4b illustrates a chopstick inserted into a covering attachment having multiple textures on the outer surface;

FIGS. 7, 7a and 7b illustrate covering attachments having food handling features on their outside surfaces;

FIG. 8 illustrates a portion of a covering attachment in two complementary halves, each including complementary interlocking features for mating the halves together.

DETAILED DESCRIPTION OF THE INVENTION

The detailed description set forth below is intended as a description of the presently exemplified embodiments of the present invention and is not intended to represent the only forms in which the present invention may be prepared or utilized. The description sets forth the features and the steps for practicing the present invention. However, it is to be understood that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described herein may be used in the practice or testing of the invention, the exemplified methods, devices and materials are now described.

All publications mentioned herein are incorporated herein by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In general, chopsticks generally include circular cross-sections or rectangular cross-section. In either round or rectangular configuration, the outer surfaces are smooth. In some examples, the outer surface is slippery, especially if they are made of plastic, metal, porcelain or synthetic ivory materials. These are not amenable to picking up a lot of food items. In addition, they usually do not cut or aid in cutting up larger pieces of food items or scooping up small pieces of food items.

The present invention provides an improvement on what currently exists, with improved traction for picking up food items and may also provide for better scooping and/or cutting capabilities.

The present invention also relates to a covering attachment that may transform chopsticks into better eating tools and more sanitary utensils in some instances. Unlike the traditional chopstick which does not pick up food items easily or manipulate the food items, like cutting or scooping, the covering attachment may include pick up features and/or cutting features.

The present invention relates to a covering attachment for chopsticks to make ordinary and/or standard chopsticks into better eating utensils.

Figure 6:
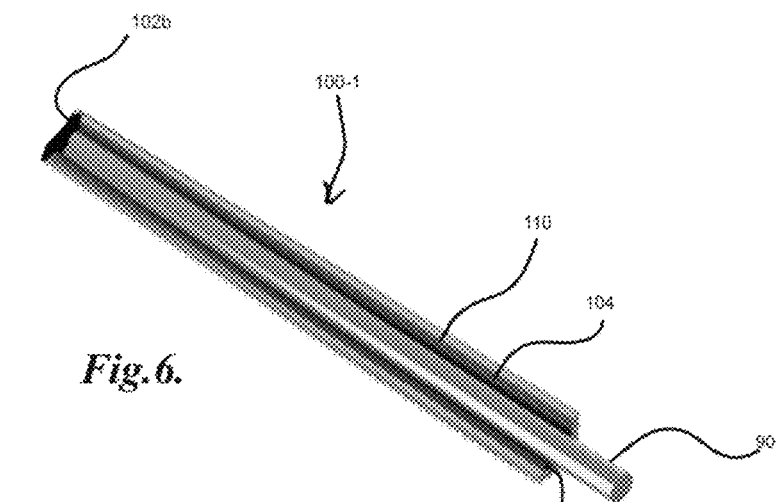
FIGS. 6 and 6a illustrate covering attachments having open and closed ends.

A covering attachment 100 for a chopstick is disclosed, as shown in the figures. The covering attachment 100-1 may include a hollow structure having a hollow body adapted for enclosing a chopstick, as shown in FIG. 6. The hollow body may include an inside surface 104 and an outside surface 106 with a thickness therebetween joining the inside surface with the outside surface. A plurality of attachment features 105 on the inside surface 104 of the hollow body are for aiding in attaching the covering structure 100 to the chopstick during use and removal from the chopstick after use. The attachment features may also aiding accommodating various sizes and configurations of the chopsticks and thus making the covering a more universal covering.

Figure 5:
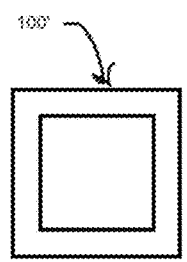
FIGS. 5, 5a and 5b illustrate different cross-sections of covering attachments.
Figure 5A:
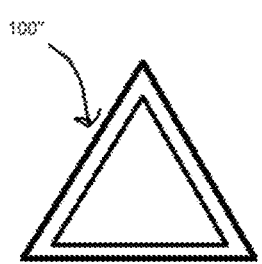
Figure 5B:
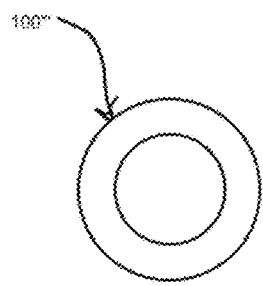

The covering attachment 100 may include at least one food handling feature on the outside surface 106. The food handling feature may include any one or more of the features for aiding in picking up food articles, better retaining of food articles once pick up, for cutting or aiding in cutting up food articles or combinations thereof The hollow body may generally be tubular having a substantially circular cross-section, or rectangular or square cross-section or triangular cross-section, as shown in FIGS. 5, 5a and 5b.

Since chopsticks come in different sizes and shape, a different covering may, in general, be needed to be used in each instance. The present invention provides for a universal covering attachment, to cover chopsticks of any size or shape, with the aid of attachment features, for example, resilient projections, bumps, leaf springs, mesh, sponge-like members, a foam layer surrounding the inside surface 104, or a snap-in cutout, as shown, in FIGS. 1, 1a, 1b, 2, 2a, 2b, 2c, 2d and 2e, as 105, 105a, 105b, 105c, 105', 105", 105-1, 105-3, 105-4 and 105-5. These resilient projections, bumps, leaf springs, mesh, sponge-like members, a foam layer surrounding the inside surface 104, or a snap-in cutout, shown as 105, 105a, 105b, 105c, 105', 105", 105-1, 105-3, 105-4 and 105-5, for example, are generally not very rigid, but are resilient, or possess some give, so they may extend and contract or compress to conform to the size or shape of the chopstick thus aiding in making the covering attachment 100 universal. These resilient features may generally be made of polymeric materials (natural or synthetic) or metallic materials, which may be rigid or not be resilient if they are in some configurations or forms, but are resilient in the exemplary configurations or forms disclosed herein.

Figure 4:
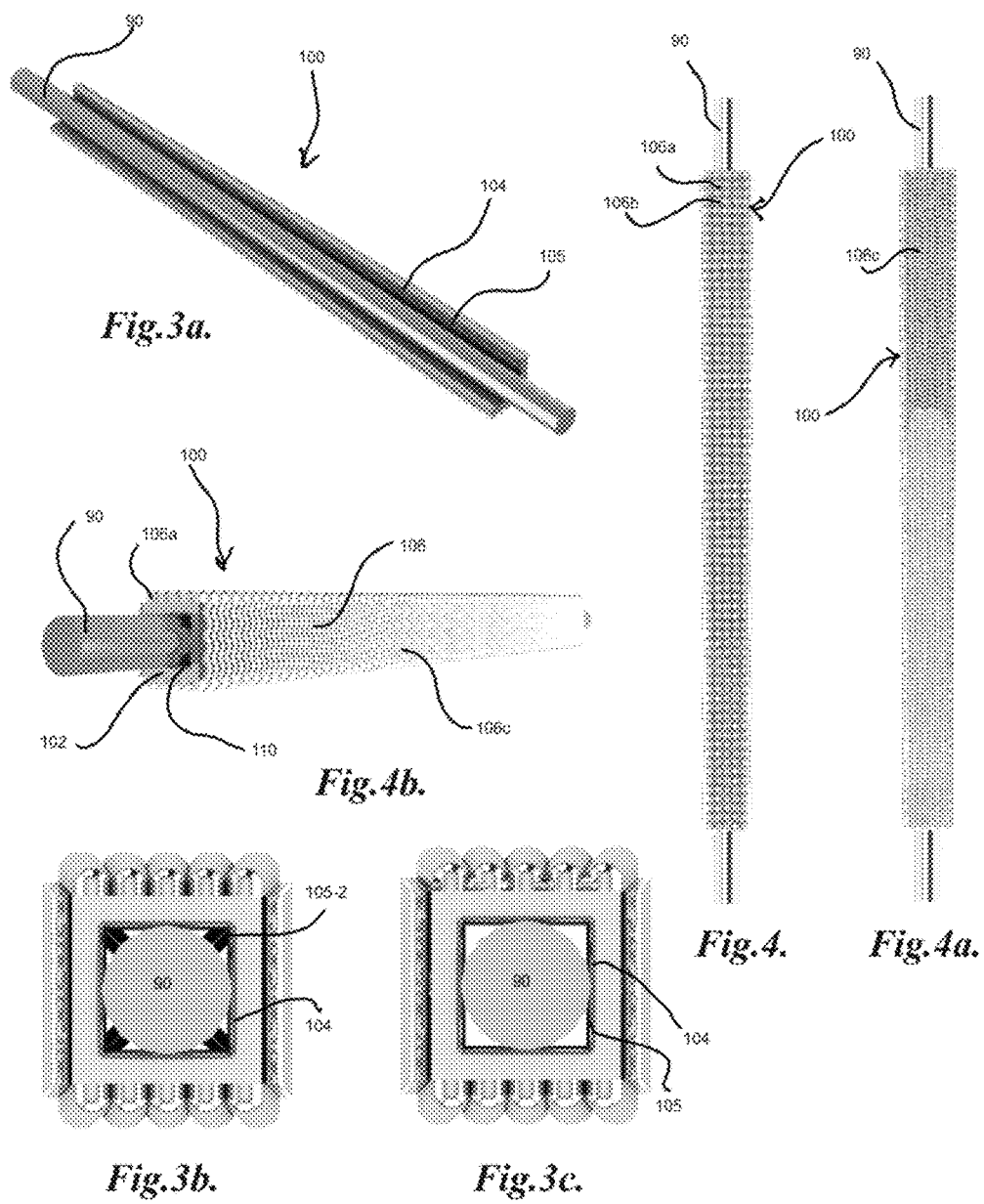

The food handling features aid in picking up food articles easier may also aid in better retaining of food articles once pick up. In addition to the above described food handling features, the outside surface 106 of the hollow body 100 may also include other features for aiding in or in cutting up food particles or both, for example, 106d and 106e, as exemplified in FIGS. 7, 7a and 7b,. Most of these features may be present towards the food picking up end of the chopstick, once the chopstick is covered or attached to the covering attachment. In addition, the outside surface 106 of the hollow body 100 may also be textured, for example, 106, 106a, 106b, 106c, for further aiding in food pick up or retention, as shown in FIGS. 4, 4a and 4b.

The plurality of attachment features may aid in attaching or securing the hollow body to the chopstick it is associated with during use and for removal after use, as noted before. The covering and/or chopstick may then be cleaned for re-use where either or both the covering and chopsticks is/are reusable; or may be disposed of after removal if the chopstick is not disposable and the covering is. In cases where both the covering and chopsticks are disposable, no removal is necessary and thus may lessen the functional requirements of the attachment features. In such cases, the covering may, for example, be simplified since no removal is necessary and, for further example, the covering may be substantially permanently attached after it is secured.

The hollow body of the covering attachment 100 may be integrally formed or in two sections to be mated together. FIG. 1 illustrates a portion of a covering attachment 100 for covering an ordinary and/or standard chopstick. This may represent one section of the covering 100 if the hollow body includes two sections mated together. The portion of a covering attachment 100 may, as illustrated, form half of a full covering attachment 200, as illustrated in FIG. 1a, such as, for example, with two portions 100 joining together to form the full covering attachment 200. In general, the portion 100 may have a form which may mate to another portion 100 to form a full enclosure, such as with the L-shaped cross-sectional shell 102 illustrated in FIG. 1, with the inner surface 104 forming a portion of a longitudinal channel 110, and the outer surface 106 forming the exterior of the covering attachment, as shown in FIG. 1a. Attachment features may generally be formed on the inner surface 104, as shown with attachment features or gripping features 105.

Figure 8A:
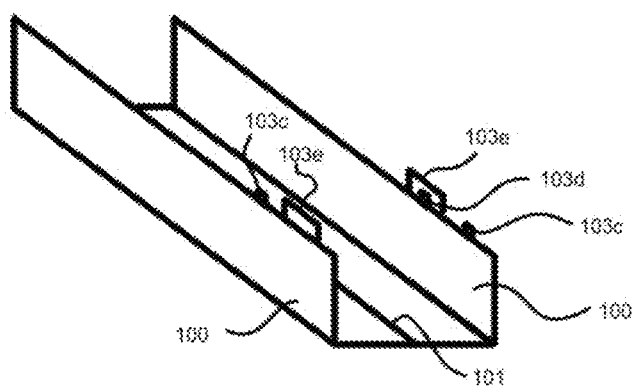
FIGS. 8a and 8b illustrate a hinged covering attachment with interlocking features.
Figure 8B:
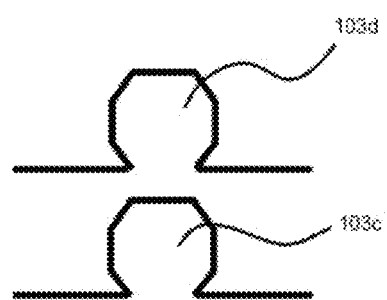

As discussed above, some hollow bodies may come in two sections, each section having a plurality of attachment features on the inside surface 104 and food handling features on one or both sections. The sections may be identical or similar, except for the food handling features and may include complementary interlocking or mating features for mating the two sections together. The interlocking or mating features may include grooves and protrusions, tongue and groove, and similar, one of which is shown in FIG. 8. In FIG. 8, a portion of a covering attachment in two complementary halves, each includes complementary interlocking features 103a and 103b, for mating together into one hollow body. These complementary interlocking features may reversibly mate the halves together to make an integral hollow body. In other embodiments, as illustrated in FIG. 8a, the two complementary halves 100 may be formed with a hinge connection between them such that the two complementary halves 100 may be closed together, as illustrated with hinge 101. The halves 100 may also include features for reversibly securing them together, such as with the complementary features 103c, 103d as illustrated in FIG. 8a. For example, the complementary features 103c, 103d may include a protrusion 103c on one of the two halves 100 which may fit into an indentation 103d on the other of the two halves 100. The protrusion 103c and the indentation 103d may further be, for example, sized and/or shaped such that they may reversibly snap together, such as, for further example, with the protrusion 103c being slightly larger than the opening of the indentation 103d, as illustrated in FIG. 8b. The halves 100 may further include handles or other handling features, such as the handles 103e as illustrated in FIG. 8a, for manipulating the two halves 100 to reversibly close them together about a chopstick. At least one of the complementary features, such as the indentation 103c or the indentation 103d, may further be disposed on the handles 103e, as illustrated with indentation 103d being formed into the handle 103e. The handles 103e may further be staggered on the two complementary halves 100 such that they do not interfere with each other and/or are more easily handled by a user. In some embodiments, the handles 103e and/or the complementary features 103c, 103d may also shaped and/or formed similarly to the surface features on the outer surface 106 for gripping food, such as, for example, similarly to 106d and/or 106e in FIGS. 7, 7a and 7b.

The hollow body of the covering attachment may be of a tubular structure having a square or rectangular cross-section, a triangular cross-section, or a circular cross-section, as illustrated with hollow bodies 100', 100" and 100''' in FIGS. 5, 5a and 5b, respectively. In some embodiments, the covering attachment may include a hollow body that is open along the longitudinal axis in the form of a three-quarter section, a half-clam shell or C-shaped sections. When attached to the chopstick, only a narrow longitudinal section of the chopstick is not covered.

The hollow body 100 may or may not be a self supporting structure, but it is not necessary for it to be structurally rigid by itself. In one embodiment, the covering may be a rigid structure or a semi-rigid structure. In another embodiment, the covering may be a resilient structure and the underlining chopstick may serve to stiffen the structure. In a further embodiment, the covering may be collapsible when not attached to the chopstick.

The plurality of attachment features may come in different forms. In one embodiment, the attachment features may be in the form of resilient projections, 105, 105*a*, 105*b* and 105*c*, as shown in FIGS. 1, 1*a* and 1*b*, which are shown to be projecting from the inside surface 104 of the hollow body 100. The resilient projections may include flexible or semi-flexible tendrils or fibril-like features that may bend or extend. The projections may project from the inside surface 104 in various directions, for example, in an orthogonal direction from the surface, such as making an acute angle with the surface. For example, the tendrils or fibril-like features 105, may extend to contact any surfaces they are to attach, or bend to release from such surfaces. These tendrils or fibril-like features 105, may be bristle-like, for example, and may be more or less densely populated, like those bristles on a tooth brush head, on the inside surface 104 of the hollow body 100, and may or may not be present on substantially the entire inside surface 104

In some embodiments, the gripping features 105 may extend orthogonally from the inner surface 104, as illustrated in FIGS. 1 and 1*a*. In other embodiments, the gripping features may extend at non-orthogonal angles from the inner surface 104, such as with crossed gripping features 105' in FIG. 1*b*, which may, for example, form alternating x-shaped gripping features 105*a*, v-shaped gripping features 105*b*, slash gripping features 105*c*, and/or any combination, arrangement or subset thereof In another embodiment, the attachment features may include array of flexible or semi-flexible small bumps, 105', disposed on the inside surface 104 of the hollow body 100 and may or may not be present on substantially the entire inside surface 104, as illustrated with bumps 105" on inner surface 104 of FIG. 2. These bumps 105' may project from the inside surface 104 of the hollow body 106 or simply present on the inside surface 104.

In yet another embodiment, the attachment feature may include mesh-like features, disposed on the inside surface of the hollow body, and may expand and contract, and may or may not be present on substantially the entire inside surface, such as illustrated with the mesh 105-1 on inner surface 104 of FIG. 2*b*. These mesh-like features 105-1 may project from the inside surface 104 of the hollow body or simply disposed on the surface 104 in a random fashion.

In still another embodiment, the attachment feature may include elements which may act as leaf springs, which may flex to provide a biasing force to hold the covering onto the chopstick, as illustrated with leaf spring gripping features 105''' on inner surface 104 in FIG. 2*a*.

In yet another embodiment, the features may be sponge like and may or may not be present on substantially the entire inside surface of the hollow body, as illustrated with sponge-like attachment features 105-3 on inner surface 104 of FIG. 2*c*. The sponge-like attachment features may also be a foamed layer, as illustrated as 105-4 in FIG. 2*d*. The foam layer may expand and contract for securing or removal of the covering attachment similar to 100 if the covering attachment is in the more than three-quarter section, half-clam or C-shaped sections, or 100 in a full covering attachment, as shown in FIG. 4*b*. In any of the embodiments, the semi-flexible or flexible features may be made of resilient materials including elastomeric materials that may securely hold onto the chopstick during use and also enable the covering attachment to be easily inserted or removed from the chopsticks.

In still another embodiment, the features may include a snap-in cutout which may include a cutout in the shape of a chopstick, as illustrated with the holding cutout 105*d* of snap-in cutout 105-5 in FIG. 2*e*. The opening of the snap-in cutout 105-5 may generally be slightly flexible and/or deformable and slightly smaller than the size of the chopstick such that the chopstick may be pressed into the holding cutout 105*d* and retained within. The snap-in cutout 105-5 may be present as a plurality of discrete features disposed on the inside surface of the hollow body or it may be a single continuous feature along substantially the entire length or a portion thereof. The snap-in cutouts 105-5 of one of the two halves 100 of the hollow body may further be positioned and/or staggered such that they do not interfere with the snap-in cutouts 105-5 of the other of the two halves 100.

In some embodiments, the attachment features may extend from the inner surface 104 at the corners of the L-shaped cross-sectional shell 102, as illustrated in FIGS. 3 and 3*b*.

In one embodiment, the hollow body of the covering attachment 100 may be made of the same material as that of the attachment features, for example, resilient projections. In another embodiment, the attachment features, for example, resilient projections of the hollow body of the covering attachment may be made of a more elastomeric material than the hollow body.

Figure 6A:
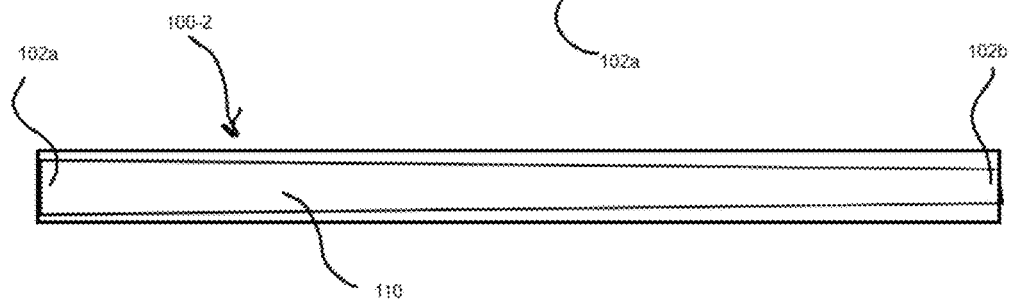

The hollow body of the covering attachment 100 may be closed at one end, as illustrated with closed end 102*b* and open end 102*a* of the covering attachment 100-1 in FIG. 6, or may be open at both ends, as illustrated in FIGS. 1, 1*a*, 1*b*, 3, 3*a*, 4, 4*a* and 4*b*. The hollow body may be straight or tapered, and if tapered, it may generally taper towards the closed end, if present, as illustrated with tapered longitudinal channel 110 with open end 102*a* being wider than closed end 102*b* in FIG. 6*a*.

In one aspect, the attachment or removal of the covering attachment with an integral hollow body may be accomplished by an axial action, pushing along the longitudinal axis of the covering attachment. The attachment features may flexible or bend about the longitudinal axis. In another aspect, the attachment or removal of the covering attachment may be accomplished by a rotary action, rotating about the longitudinal axis of the covering attachment. The attachment features may rotate or twist about the longitudinal axis. When the chopstick is inserted, the attachment features may also be compressed between the chopstick and the inner surface, as illustrated with chopstick 90 compressing attachment features 105, 105-2 in FIGS. 3*b* and 3*c*.

In the case of two half sections 100 mated together to form body 200, each section may be positioned onto to the chopstick and mated together. The removal action may be similar to above, or the sections may be separated prior to removal.

In the case of a more than three-quarter section, C-shaped sections or half-clam sections, the body may be positioned onto the chopstick and removed in the same manner described above, axially or rotationally.

FIGS. 4 and 4*a* illustrate different textures that may also be present on the outer surface 106 of the covering attachment 100, in addition to food handling features, as shown in FIGS. 7, 7*a* and 7*b*. In embodiments where the covering attachment 100 is a portion of a full covering attachment, each portion may have the same, different, and/or a mix of textures such that when assembled, the full covering attachment may also have the same texture overall or a combination of textures and/or arrangements of textures on the outer surfaces 106. FIG. 4 illustrates a texture with a series of dimples 106*a* which form gripping protrusions 106*b*. FIG. 4*a* illustrates a texture with a series of grooves 106*c*, which may be arranged in a pattern, such as the chevron-like or herringbone pattern illustrated in FIG. 4*a*. In some embodiments, the texture formed from dimples 106*a* in FIG. 4 may be present on one side of the L-shaped cross-sectional shell 102 while the texture formed by grooves 106c in FIG. 4a may be present on the other side of the L-shaped cross-sectional shell 102, as seen in FIG. 4b.

The length of the covering attachment may vary and may cover a portion of or at least the traditional length of the chopstick generally used for food handling. FIGS. 3, 3a, 4, 4a and 4b illustrate embodiments of a covering attachment 100 which covers the majority of the length of the chopstick 90.

The covering attachment may also include a portion on the outside surface for gripping by the fingers of the user if desired, when additional texturing discussed above is not present.

The gripping portion may be smooth or roughen to aid in the grip. In some embodiments, the gripping portion may include an indent for easier grip by any part of the finger or fingers.

In one exemplary embodiment, the food handling feature on the outside surface of the covering attachment may include features for aiding in picking up food articles, as noted above. The food handling features on the outside of the covering attachment may include at least one depression, for example, a dimple, a channel or groove 106d, as shown in FIGS. 7 and 7b, disposed, at least, towards the food handling end of the covering. The dimple, groove or channel 106d may extend in a lengthwise direction, along the longitudinal axis of the covering, towards the food handling end of the covering, and may be so shaped to minimize any food or liquid that is picked up from existing from the end of the covering. The dimple, groove or channel 106d may in general have a major axis and a minor axis, with the major axis either longer or substantially longer than the minor axis.

The shape of the food handling feature may be of an oval shape, as shown in FIGS. 7 and 7b, or those having a triangular cross-section, or a rectangular cross-section. For all the shapes, they are open at least at the top. In one aspect, the dimple, groove or channel 106d may be enclosed by walls having a straight line configuration. In another aspect, the groove or channel 106d may be enclosed by walls having a curved or winding cross-sectional configuration. The dimple, groove or channel 106d may taper along the longitudinal axis of covering so that the dimple, groove or channel 106d may include a wider cross-section towards the end than the beginning, or the dimple, groove or channel 106d may taper along the longitudinal axis from a central location towards both ends. In one embodiment, the dimple, grove or channel 106d may aid in transforming any smooth surface chopstick into a better food gripping chopstick. In another embodiment, the dimple, groove or channel 106d may aid in transforming any chopstick into a spoon-like utensil for scooping.

In addition to the configuration of the walls, the number of walls may also vary. In one embodiment, the dimple, groove or channel 106d may include two walls. The walls may be connected at least one end. When connected at one end, the configuration is open at the top and one end. When they are connected at both ends, the configuration will only be open at the top. In another embodiment, the dimple, groove or channel 106d may include more and two walls. All the walls may be connected on both ends, or one of the walls may be connected at one end. In either case, the configuration is open at the top.

In one embodiment, the dimple, channel or groove 106d, whether it has two or three walls, it may be opened at one end in addition to the top. In another embodiment, the dimple, channel or groove 106d, whether it has two or three walls, it may be completely enclosed except for the opening at the top.

In another exemplary embodiment, the food handling features may include features for cutting or aiding in cutting up food articles, as noted above. The features for cutting or aiding in cutting up food articles may include at least one ridge, a raised edge, or bump, as shown as 106e in FIGS. 7a and b, disposed towards the food handling end of the covering. The ridge, raised edge or bump 106e may extend in a lengthwise direction, along the longitudinal axis of the covering, towards the food handling end of the covering. The length of the covering attachment may vary and may cover a portion of or at least the traditional length of the chopstick generally used for food handling.

In any of the above described embodiment, the covering attachment may also include a portion on its outside surface, for gripping by the fingers of the user, if desired. The gripping portion may be smooth or roughen to aid in the grip. In some embodiments, the gripping portion may include an indent for easier grip by any part of the finger or fingers. In some embodiments, the gripping portion may include similar or the same features as the food handling features.

In one aspect, the ridge, raised edge or bump 106e may include walls that may be straight. In another aspect, the ridge, raised edge, or bump 106e may include walls that may be curved. The bump, raised edge or ridge may taper along the longitudinal axis of the covering so that the raised edge, ridge or bump may include a wider cross-section towards the end than the beginning, or may taper along the longitudinal axis from a central location towards both ends. In one embodiment, the ridge, raised edge or bump 106e may aid in transforming any smooth surface chopstick into a better food gripping chopstick. In another embodiment, the bump, raised edge or ridge may aid in transforming any chopstick into a better cutting utensil or to aid in cutting up food.

In addition to the configuration of the walls, the number of walls may also vary, as noted above. In one embodiment, the raised edge, ridge or bump may include two walls. The walls may be connected at least at one end. When connected at one end, the configuration is open at one end. When they are connected at both ends, the configuration will be completely enclosed. In another embodiment, the ridge, raised edge or bump may include more than two walls. All the walls may be connected on both ends, or one of the walls may be connected at one end. In either case, the configuration is closed at the top.

In yet another exemplary embodiment, the food handling features may include a combination of at least one of a ridge, raised edge, or bump 106e, as discussed above, and at least one of a dimple, channel or groove 106d, as also discussed above, disposed towards the food handling end of the covering. The combination of features may extend in a lengthwise direction, along the longitudinal axis of the covering, towards the food handling end of the covering. The length of the covering attachment may vary and may cover a portion of or at least the traditional length of the chopstick generally used for food handling. The covering attachment may also include a portion for gripping by the fingers of the user if desired. The gripping portion may be smooth or roughen to aid in the grip. In some embodiments, the gripping portion may include an indent for easier grip by any part of the finger or fingers. In one aspect, the features may include walls having a straight cross-sectional configuration. In another aspect, the features may include walls having a curved or winding cross-sectional configuration.

The features may taper along the longitudinal axis of the covering so that the features may include a wider cross-section towards the end than the beginning. In one embodiment, the features may aid in transforming any smooth surface chopstick into better food gripping chopstick. In another embodiment, the features may aid in transforming any chopstick into a better cutting utensil or to aid in cutting up food, for example, prior to picking up the food.

In the embodiment where the hollow body 100', 100" and 100''' are in two sections, one food handling feature 106d may be on one section and a different feature 106e on the second section, such as shown in FIG. 7b. In some embodiments, one food handling feature may be present on one section and the second section may have no food handling features except for texture.

Referring again to FIGS. 7, 7a and 7b, and all the embodiments described above in relationship to the food handling features 106d and 106e, in addition to the food handling features shown as 106d and 106e, the surface of the covering attachment may also include texture, such as those shown in FIGS. 4, 4a and 4b.

According to one embodiment, the covering may include a tubular configuration for surrounding a portion of the chopstick it is associated with an open end and a closed end. In one aspect, the tubular configuration may have a circular cross-section. In another aspect, the tubular configuration may include a non-circular configuration, for example, it may have a square cross-section or triangular cross-section. The closed end may be the food handling end and thus also helps make the chopsticks more sanitary. For the body that comes in two sections, it may also have one close end. Having a closed end on the body with three-quarter section, C-shaped sections or half-clam shaped sections, the sanitary advantage may not be possible even with close end configuration.

The length of the covering attachment may vary and the portion of the chopstick to be covered may vary in length and location on the chopstick, as noted above. The covering attachment may be made of any polymeric material or metal that is approved for food contact, or bamboo, and may have sufficient stiffness at its thickest portion to be a standalone structure, if so desired, even if the portions where the dimple, groove or channel 106d is present may not be of sufficient structural stiffness. In some instances, the hollow structure may be collapsible, as also noted above.

For polymeric materials of inherently greater structural stiffness, the thickness of the covering may be decreased. For the polymeric materials that have less structural stiffness, the thickness of the covering may be increased. The polymeric material may include, but are not limited to generally inert materials that do not contain harmful monomers or oligomers that may leach out, for example, polyolefins, such as polyethylene, high density polyethylene, linear low density polyethylene, polypropylene, polyesters and copolyesters, polyamides, melamines, silicone polymers, synthetic rubbers, cellulosic material including ethyl, hydroxyethyl, hydroxypropyl and methyl ethers of cellulose.

The metal may include alloys such as stainless steel, silver or any other non-toxic and other non-corrosive and/or relatively insert metals and alloys.

In one aspect, the covering may be molded into the desired form and shape, having the features on its outside surface and inside surface. In another aspect, the covering may first be formed in sheet or film-form, with the desired features on both surfaces, either added later or formed together, and then fashioned or joined together to form the covering or the film may be shaped to the desired configuration, for example, two half sections or one three-quarter sections full tubular sections. The film may be drawn, cast, extruded, calendared, machined, extruded and calendared, machined or blown.

The polymeric material may also be filled or colored, provided the coloring agent and/or filler is approved for food contact. In general the filler may improve and/or maintain the structural stiffness of the covering without substantially increasing the caliper of the covering.

The polymeric material may also be biodegradable or compostable, provided the material is approved for food contact. In general, biodegradability or compostability is considered better for the environment.

The covering attachment may be packaged and sold separately or in pairs. The pairs may include identical or different components, for example, food handling features. When sold separately, one may be able to mix and match the food handling features.

The covering attachment may also be sterilized and package in sterile packages for further protection of the user. The packaging may also come in various designs and may be disposable or reuseable. Sterile packaging may also be sold for carrying the covering once it has been used and cleaned, ready for use.

It will be appreciated by those of ordinary skill in the art that the present invention can be embodied in other specific forms without departing from the spirit or essential character hereof The present description is therefore considered in all respects to be illustrative and not restrictive. The scope of the present invention is indicated by the appended claims, and all changes that come within the meaning and range of equivalents thereof are intended to be embraced therein.

The invention claimed is:

1. A covering attachment for a chopstick comprising:
a hollow structure having a closed end and an open end adapted for enclosing a portion of a chopstick, said hollow structure having a hollow body comprising a first and a second mating sections, each of which having an inside surface and an outside surface with a thickness therebetween joining the inside surface with the outside surface;
a plurality of resilient features disposed on said inside surface adapted for attaching the covering attachment to said chopstick to form an integrated structure with said chopstick during use; and
at least one food handling feature on said outside surface of one section of the body adapted for handling food during use, said food handling feature comprises features for aiding in picking up food articles retaining said food articles, or combinations thereof.

2. The covering attachment of claim 1 wherein said food handling feature comprise an oval-shaped dimple on the outside surface of the hollow structure, said oval shape dimple is enclosed by walls and open on the top side.

3. The covering attachment of claim 1 wherein said food handling feature comprises a dimple, groove or channel on the outside surface of the hollow structure, said groove or channel is enclosed by walls on two or three sides.

4. The covering attachment of claim 1 further comprising a second food handling features for cutting or aiding in cutting up food articles.

5. The covering attachment of claim 4 wherein said food handling features for cutting or aiding in cutting up food articles comprises at least one ridge, a raised edge, bump or combinations thereof.

6. The covering attachment of claim 1 wherein said outside surface of said hollow structure is textured.

7. The covering attachment of claim 1 further comprising a food handling feature portion on the second section of the body that is different from the food handling feature on the first section of the body.

8. The covering attachment of claim 1 wherein said food handling feature comprises features for aiding in picking up food articles, for retaining said food articles, for aiding in cutting up food articles, or combinations thereof.

9. The covering attachment of claim 1 wherein said plurality of resilient features comprise flexible or semi-flexible tendrils or fibril-like features, flexible or semi-flexible array of small bumps, mesh-like features, leaf spring elements, form layer, snap-in cutouts or combinations thereof.

10. A covering attachment for a chopstick comprising:
a hollow structure adapted for enclosing a portion of said chopstick, said hollow structure having a hollow body having two open ends and comprising a first and a second matting portions, each of which having an inside surface and an outside surface with a thickness therebetween joining the inside surface with the outside surface;
a plurality of attachment features on said inside surface of the hollow body adapted for aiding in securing the hollow structure to said chopstick to form an integrated structure with said chopstick during use and removal from said chopstick after use; and
at least one food handling feature on said outside surface of at least one section of the hollow body adapted for handling food during use, said food handling feature comprises features for aiding in picking up food articles, for retaining said food articles, for aiding in cutting up food articles, or combinations thereof.

11. The covering attachment of claim 10 wherein said outside surface also comprises textured features for further aiding in food handling.

12. The covering attachment of claims 11 wherein said features for aiding in picking up food articles comprise depressions on the outside surface of said hollow body.

13. The covering attachment of claim 12 wherein said depressions comprises at least one dimple, channel or groove.

14. The covering attachment of claim 10 wherein said plurality of attachment features on said inside surface comprises resilient features disposed on said inside surface.

15. The covering attachment of claim 14 wherein said plurality of resilient features comprise flexible or semi-flexible tendrils or fibril-like features, flexible or semi-flexible array of small bumps, mesh-like features, leaf spring elements, form layer, snap-in cutouts or combinations thereof.

16. The covering attachment of claim 14 wherein said resilient features are randomly disposed on the inside surface.

17. A chopstick with a covering, comprising:
a chopstick;
a hollow structure adapted for enclosing a portion of said chopstick, said hollow structure having a hollow body comprising a first and a second sections each of which having an inside surface and an outside surface with a thickness therebetween joining the inside surface with the outside surface;
a plurality of resilient features disposed on the inside surface of at least one section of the hollow structure adapted for aiding in securing the covering structure to said chopstick to form an integrated structure with said chopstick during use and removal from said chopstick after use; and
at least one food handling feature on said outside surface of the hollow structure adapted for handling food during use, said food handling feature comprises at least one dimple, one channel, one ridge, a raised edge, a bump or combinations thereof.

18. The covering attachment of claim 17 wherein said hollow structure is of a rigid structure.

19. The covering attachment of claim 17 wherein said resilient features are made of the same material as the hollow structure.

20. The covering attachment of claim 17 wherein said resilient features are made of an elastomeric material.

* * * * *